United States Patent [19]

Uiterwaal

[11] Patent Number: 4,529,611

[45] Date of Patent: Jul. 16, 1985

[54] DRIED MILK PRODUCT AND METHOD FOR MAKING THE SAME

[75] Inventor: Dirk J. D. Uiterwaal, Bodegraven, Netherlands

[73] Assignee: Melkunie Holland B.V., Woerden, Netherlands

[21] Appl. No.: 551,964

[22] Filed: Nov. 15, 1983

[30] Foreign Application Priority Data

Nov. 15, 1982 [EP]  European Pat. Off. ........ 82201445.2

[51] Int. Cl.³ .................... A23C 9/60; A23C 9/142; A23C 9/12
[52] U.S. Cl. .................................. 426/588; 426/34; 426/42; 426/491
[58] Field of Search ................ 426/34, 42, 41, 491, 426/588

[56] References Cited

U.S. PATENT DOCUMENTS

| | | | |
|---|---|---|---|
| 2,749,242 | 6/1956 | Stimpson et al. | 426/41 |
| 3,753,725 | 8/1973 | Williams et al. | 426/491 |
| 3,930,039 | 12/1975 | Kuipers | 426/491 |
| 3,963,837 | 6/1976 | Maubois et al. | 426/491 |
| 4,091,116 | 5/1978 | Edwards | 426/42 |
| 4,358,464 | 11/1982 | Soehnlen | 426/491 |
| 4,391,837 | 7/1983 | Kocher | 426/491 |

FOREIGN PATENT DOCUMENTS

7507547  12/1976  France .................. 426/42

*Primary Examiner*—Steven Weinstein
*Assistant Examiner*—Marianne S. Minnick
*Attorney, Agent, or Firm*—Buell, Ziesenheim, Beck & Alstadt

[57] ABSTRACT

The invention relates to pulverized products, containing little lactose and an amount of available lysine that does not decrease substantially at storage, at least 20 weight % of which consists of dried milk products, at least 50% by weight of the lactose of which has been hydrolyzed and being of a blend of (a) particles, the solids of which consist substantially of milk proteins and a part of the lactose that was present in the milk product used as starting material
(b) particles, the solids of which consist substantially of the reaction products that are present after hydrolysis of lactose to glucose and galactose, and a method of preparing such pulverized products on basis of a lactose-hydrolyzed milk starting material without loss of available lysine.

5 Claims, No Drawings

DRIED MILK PRODUCT AND METHOD FOR MAKING THE SAME

Pulverized products, containing little lactose, at least 20 weight percent of which consists of dried milk products, at least 50 weight percent of the lactose of which has been hydrolyzed.

The invention relates to pulverized products, containing little lactose, at least 20 weight percent of which consists of dried milk products, at least 50 weight percent of the lactose of which has been hydrolyzed, a method of preparing same and compositions prepared by using said products.

Products of said type, having e.g. an average analysis:
- proteins 35–36 weight percent
- butter fat 1–1.5 weight percent
- lactose 0–1 weight percent
- glucose 25–26 weight percent
- galactose 25–26 weight percent
- minerals 7–8 weight percent
- moisture 3.5–4.5 weight percent are commercially available.

It is generally known that lactose may cause digestive upsets. Said lactose intolerance, which is due to a too low lactase activity in the human digestive tract, is discussed extensively e.g. in the thesis of Jan Zaal "A study on the prevalence and implications of hypolactasia in Surinams' Bushnegro-children" Amsterdam (1977), while the subject is fundamentally described in the Joint FAO/WHO-report "Cabohydrates in Human Nutrition" (Rome, 1980).

Said low lactase activity may be due to ontogenetic factors (indicated as hypolactasia) as well as to pathological factors (indicated as lactase deficiency). Said lactase deficiency may be generated as a congenital defect, as a consequence of gastroenteritis or as a consequence of a non-adequate food regimen.

Due to the relatively high lactose contents of milk in a number of cases there is a reason to look for a proper solution of said problems. On one side the percentage of lactose may be decreased by removing lactose from milk (e.g. by subjecting milk to an ultrafiltration) or by adding non-milky lactose free components to milk or milk products. On the other side the undesired effects of lactose may be avoided by decreasing the percentage of lactose in milk and milk products, e.g. by subjecting said milk to a hydrolysis of lactose.

In the last mentioned case milk components which are very valuable from a food point of view, would become also available for persons having a low lactase activity.

Particularly the calcium supply, that is important for building up the osseous system in the growing period and for maintaining the skeleton in later periods may be secured in this way. From scientific investigations it is known e.g. that there is a correlation between osteoporose, lactase deficiency and a reduced consumption of liquid milk. (Vide "Consumption of liquid milk" by A. D. Newcomer c.s. am. Intern Medic 89, 218–220 (1978).

In hydrolyzed milk and milk products lactose is at least partially broken down into the hexoses, glucose and galactose. Particularly monosaccharides react preferably with the amino acid lysine. In such a reaction, the essential amino acid lysine will loose its important contribution to the NPU (Net Protein Utilization) of milk. Said reaction occurs in hydrolysed milk especially during its processing into milkpowder. Moreover, depending on the conditions, said reactions proceed also in the dried product as described a.o. in the thesis of Anders Burvall "Lactose hydrolysis" (Lund (Sweden), 1978).

Due to said "Maillard reactions" the nutritive value of hydrolysed milk (and milk products) is affected in an inacceptable way. From the literature it is known that in the usual evaporating processes and drying processes the amount of lysine available may be reduced by 15 to 30 weight percent (vide e.g. Zaal's above thesis). Moreover, it appears that after some months the percentage of lysine in the final product may decrese by up to 50 weight percent. This has been confirmed in Applicants' laboratory.

The only known method of drying a prehydrolysed milk, that results in a powder having a substantially unaffected nutritive value, is freezer-drying (vide Burvall, 1978). However, said method is very expensive due to the high investment and due to the high consumption of energy. Consequently, in general it may not be used in a paying way for the preparation of milk products.

Moreover, the "Maillard reactions" that occur during preservation are not avoided if the pulverized product is prepared by means of freeze-drying.

It was found now, that pulverized products that consist of a blend of particles, wherein are present:
(a) particles, the solids of which consist substantially of milk proteins and a part of the lactose that was present in the milk products used as starting material,
(b) particles, the solids of which consist substantially of the reaction products that are present after hydrolysis of the lactose, to glucose and galactose, do not show a decrease of the amount of available lysine during its preparation, while during storage just a little decrease of the amount of available lysine is observed, so indicating that the damage to the NPU is highly avoided.

Such a pulverized product may be prepared e.g. by subjecting the milk product used as starting material, to an ultrafiltration wherein the resulting retentate contains substantially all milk proteins, and the permeate contains substantially all lactose of the starting material, subjecting said permeate to a hydrolysis, concentrating and drying said retentate and said hydrolysed permeate separately and blending said dried products in a selected ratio.

In the ultrafiltration step the amount of lactose, in the retentate, may be adjusted by means of a volume reduction, combined or not combined with a diafiltration treatment.

The lactose in the permeate and—optionally—in the diafiltrate is hydrolysed into glucose and galactose. All hydrolysis methods known, enzymatic as well as chemical may be used. The degree of hydrolysis may be adjusted for the purpose intended.

By blending the separately prepared dry components a powder is obtained wherein dried milk proteins and dried reaction products of the hydrolysis of lactose are present simultaneously.

A characterizing difference between a product according to the invention on one side and a directly hydrolyzed dried starting product on the other side is, that a product according to the invention consists of a non-homogeneous blend wherein are present:

(1) particles built up substantially homogeneously and consisting of milk proteins, fats, carbohydrates, minerals and vitamins, derived from the milk product used as starting material, supplemented, if desired, with components added to the starting material and/or to the retentate, (2) particles substantially homogeneous, consisting of a blend of lactose and the hydrolysis products of lactose, glucose and galactose, as well as small amounts of oligomers of said products due to side reactions, minerals and vitamins derived from the starting milk product supplemented, if desired, with components added to the starting product and/or to the permeate.

In contradistinction therewith, a directly hydrolysed concentrated and dried starting material consists of a blend of particles built up substantially homogeneously from milk components—supplemented, if desired, with other components—wherein the monosaccharides and lysine are present in such a way that the "Maillard reactions" may proceed, while in said particles also reaction products of the "Maillard reaction" will be present already.

As a starting material may be used e.g.: whole milk, partially skimmed milk or completely skimmed milk, butter milk, that may contain an additional amount of fat, and whey.

The selection of the starting material will be determined by the final product desired. To the starting material other ingredients may be added (e.g. fat).

In cases wherein it is desired to have the total starting material available, the separately dried retentate and dried hydrolysed permeate (c.q. inclusive the hydrolysed diafiltrate) are blended quantitatively.

According to the invention it is also possible to prepare products from two kinds of substantially homogeneous particles in a blend ratio that deviates from the gross composition ratio of the solids in the starting material. Likewise, components originating from milk products or from different products may be added to the dried separated components of the starting materials; in this connection are mentioned e.g. carbohydrates, proteins, fats, vitamins and trace elements, dependent on the composition desired e.g. for a diet product. An additional advantage of the separate working up of retentates and permeates is that undesired reactions of combinations of components that might react, if they would be present simultaneously during the process or during storage, are avoided by adding them separately to the permeate or to the retentate of the ultrafiltration. Furthermore it is possible to add certain ingredients to the permeate and/or the retentate in view of the process and the final composition.

Evidently, treatments, such as pasteurization, to improve or maintain the microbiological quality of the starting material may be used.

Schematically the process according to the invention may be indicated as follows:

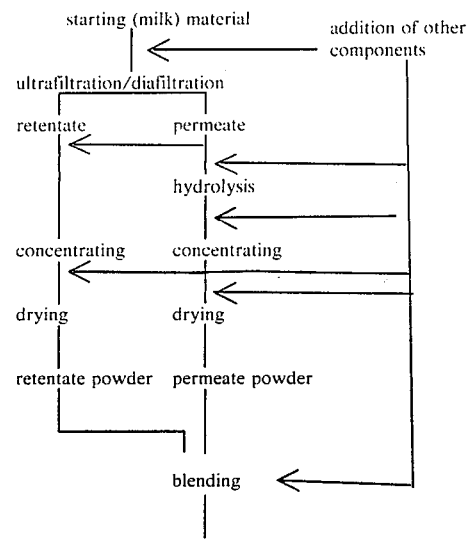

The starting material is a milk product as elucidated above. Said product is subjected to an ultrafiltration respectively diafiltration and provides a retentate and a permeate the lactose in the permeate fraction is hydrolysed subsequently and the hydrolysate is concentrated and dried. The retentate fraction is dried as such or dried after having been subjected to a concentrating step. During the various phases in the process components may be added.

The dried products may be blended in several ratios and if desired with other components.

EXAMPLE

For the preparation of a modified dried milk as a base for a diet food, a partially skimmed milk (2.4 weight percent fat) was standardized with corn oil (in order to increase the percentage of linoleic acid) at a fat percentage of 4.8 weight percent. The mixture was subjected to a homogenization (in two steps at pressures of 11.1/3.5 mPa) at 65° C. and heated for 4 minutes at a temperature of 85° C.

Subsequently the liquid was diluted with water in a weight ratio of 1:1 and subjected to an ultrafiltration at 55° C. till a volume reduction of 90 percent was achieved. The membrane used was a non-cellulosic membrane having a total rejection of Bovine haemoglobin (molecular weight 60.000), a rejection of cheese whey protein of 99 percent and a very low retention of lactose.

Further specification of the membrane: under test conditions with water as feed (pressure 1 bar, temperature 15° C.) and a minimum speedflow of 12 liters/minute, the waterflux did not exceed 170 ltr/m$^2$/hour.

The retentate was heated for 6 minutes at a temperature of 72° C. and was dried by subjecting it to a spray-drying.

77% by weight of the lactose in the permeate was hydrolysed after addition of a lactase enzyme composition (Maxilact L 2000) in an amount of 5.4 g/kg concentrated permeate at a temperature of 37° C. for 4 hours.

Subsequently the hydrolysed permeate was heated at a temperature of 65° C. and hydrolysed potato starch (Paselli SA 10). was added. The blend likewise was dried by means of spray-drying.

Both powder fractions were blended to prepare a diet food.

From the results of the analysis of the loss of available lysine (vide Table) appears that in case the product according to the above mentioned example is prepared the loss of lysine during the preparation is avoided. The loss of lysine during the storage is comparative to the loss in commercially prepared whole milk powder.

| loss of lysine available* | diet food | | retentate powder | dried whole milk |
|---|---|---|---|---|
| | acc. to the example | acc. to a conventional method** | | |
| immediately after the preparation | none | 15% | none | none |
| after storage for 8 months at 20° C. | none | 38% | none | none |

*Indicated as a percentage of the percentage of lysine available in the starting milk
**According to the conventional method the standardized milk is hydrolysed, evaporated and dried subsequently.

I claim:

1. Powder milk product containing, at least 20 weight % of dried milk products selected from the group consisting of dried whole milk, dried partially skimmed milk, dried completely skimmed milk, dried butter milk that may contain an additional amount of fat and dried whey, at least 50% by weight of the lactose of the dried milk products having been hydrolysed, said powdered milk product comprising a blend of
   (a) a first group of particles, the solids of which consist substantially of milk proteins and a part of the lactose that was present in the milk product used as starting material, and
   (b) a second group of particles, the solids of which consist substantially of the reaction products that are present after hydrolysis of lactose to glucose and galactose.

2. A method of preparing powder at least 20% by weight of which is dried milk products comprising the steps of:
   (a) subjecting a starting material from the group consisting of whole milk, partially skimmed milk, completely skimmed milk, butter milk and whey to ultrafiltration wherein the resultant retentate contains substantially all milk proteins and the permeate contains the lactose of the starting material;
   (b) subjecting said permeate to hydrolysis;
   (c) separately concentrating and drying the retentate and the hydrolyzed permeate into dried powdered form; and
   (d) blending said dried products in a selected ratio.

3. A method according to claim 2 wherein supplemental components are added to at least one of the liquid permeate and the liquid retentate.

4. A method according to claim 2 wherein dry additives are added to said blend of dried permeate and dried retentate.

5. A method according to claim 2 the ratio in which said dried retentate and said dried permeate are blended, differs from the ratio present in the starting milk material.

* * * * *